Figure 4:
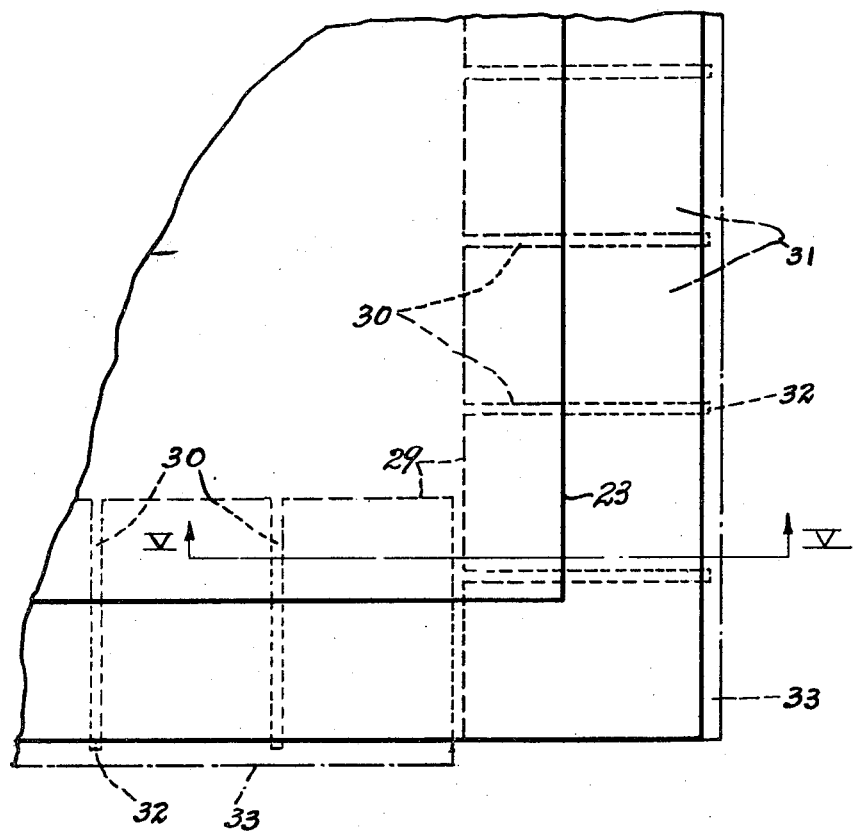

Sept. 16, 1947. T. K. GREGORIUS 2,427,557
LAMINATED UNITS AND METHODS OF MAKING THEM
Filed Sept. 27, 1944 4 Sheets-Sheet 1
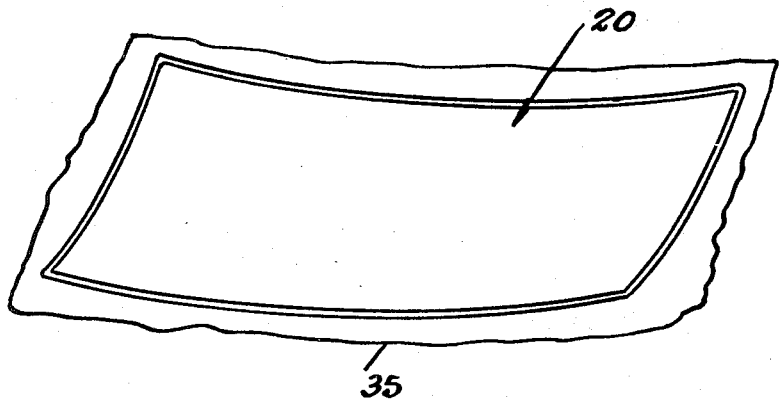
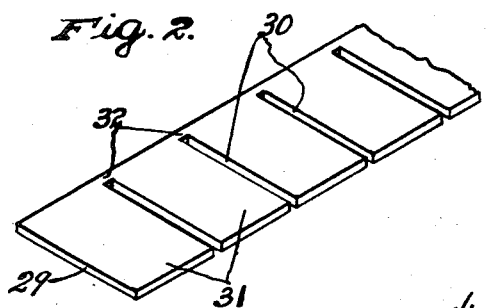
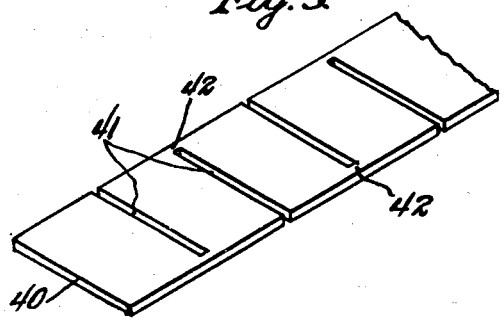
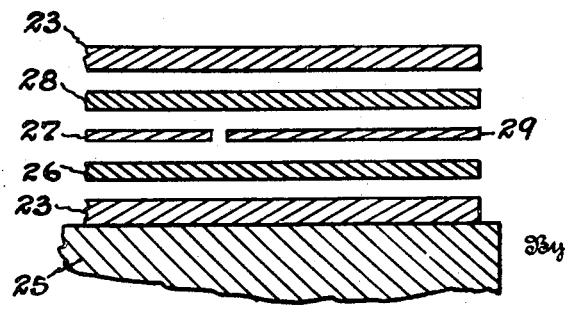
Inventor
THOMAS K GREGORIUS
By Olen E Bee
Attorney Sept. 16, 1947.  T. K. GREGORIUS  2,427,557
LAMINATED UNITS AND METHODS OF MAKING THEM
Filed Sept. 27, 1944 4 Sheets-Sheet 2

Inventor
THOMAS K GREGORIUS
By Olen E. Bee
Attorney

Sept. 16, 1947.  T. K. GREGORIUS  2,427,557
LAMINATED UNITS AND METHODS OF MAKING THEM
Filed Sept. 27, 1944  4 Sheets-Sheet 3

Inventor
THOMAS K GREGORIUS
By Olen E. Bee
Attorney

Sept. 16, 1947.　　　T. K. GREGORIUS　　　2,427,557
LAMINATED UNITS AND METHODS OF MAKING THEM
Filed Sept. 27, 1944　　　4 Sheets-Sheet 4

Inventor
THOMAS K. GREGORIUS

By Olen E. Bee
Attorney

Patented Sept. 16, 1947

2,427,557

UNITED STATES PATENT OFFICE 2,427,557

LAMINATED UNIT AND METHOD OF MAKING IT

Thomas K. Gregorius, Tarentum, Pa., assignor to Pittsburgh Plate Glass Company, Allegheny County, Pa., a corporation of Pennsylvania Application September 27, 1944, Serial No. 555,956

11 Claims. (Cl. 154—2.74)

This invention relates to the manufacture of laminated panels and it has particular relation to the construction of marginal portions of laminated panels of plastic or laminated panels of glass and plastic, together with methods of making such panels.

One object of the invention is to provide an improved method of making window panels in which marginal portions thereof are composed of several kinds of material in which differentials in coefficients of expansion of the several materials are compensated for in such manner as to obviate warped or strained laminated products.

Another object of the invention is to provide an improved window panel primarily composed of laminations of plastic or resinous sheets in which reinforced marginal portions thereof are capable of withstanding pressures and shearing forces of great magnitude in cooperation with clamping members and in such manner as to form fluid-tight connections to a surrounding wall or frame structure.

Another object of the invention is to provide an improved window panel of compound curvature, and having marginal mounting portions of such flexibility as to conform to irregular frame supporting and clamping structure in fluid-tight relation, while at the same time being capable of withstanding pressures of relatively great magnitude.

Another object of the invention is to provide an improved laminated window composed primarily of laminated glass wherein the glass is supported substantially free from clamping forces of surrounding supporting frames and wherein flexible mounting flanges include reinforcing elements of such character as to be conformable to irregular or flexible supporting frames which engage the flanges in fluid-tight relation.

In one of its important phases, the invention is designed to provide a laminated plastic window unit particularly adapted for use in airplanes at locations where considerable pressure forces are likely to be concentrated. For example, in certain types of bombers, it is extremely important that lower window portions, which are likely to strike water in forced landings at sea, be sufficiently strong to be safe from breaking under such circumstances. Laminated plastic alone has been found to be insufficiently strong to withstand forces of this kind. However, by including strip metal along the marginal mounting portions of the laminated plastic, sufficient strength can be imparted to the structure to prevent breaking of the window in forced landings at sea. Ordinary strip metal is not satisfactory because of the difference in behavior of the metal and plastic under conditions of changing temperatures which prevented a practical construction of a window unit including plain strip metal. However, to obviate this disadvantage, it has been found that strip metal can be cut almost through its width into a plurality of sections and incorporated in the plastic with narrow section-connecting portions disposed outwardly at the edges of the unit. Then the outer edges, including the narrow connecting portions, are trimmed off to leave individual metal sections which will not interfere with expansion or contraction of the plastic, but in conjunction with the covering plastic thereon, will provide a strong and flexible mounting flange capable of being clamped to irregular supporting frames in fluid-tight relation.

This type of mounting flange is also applicable to laminated glass in which its flexibility and strength provides a very efficient connection to supporting frames.

Figure 5:
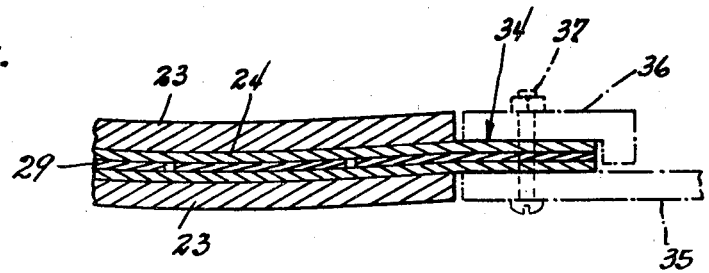
Figure 6:
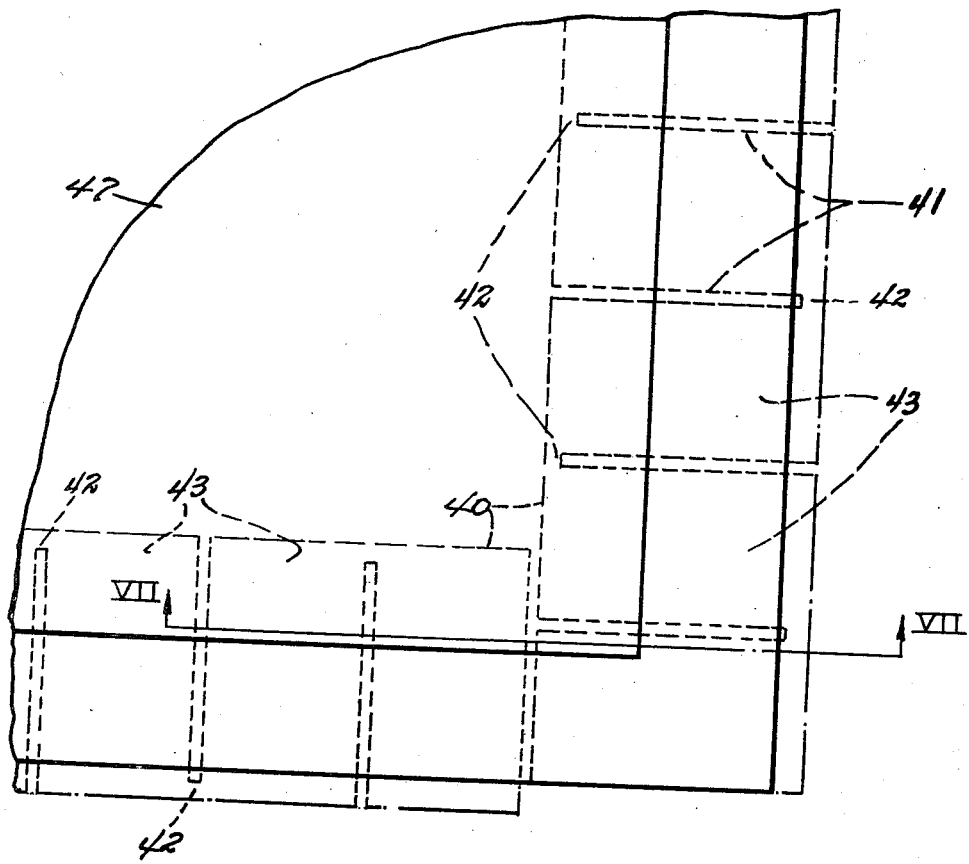
Figure 7:
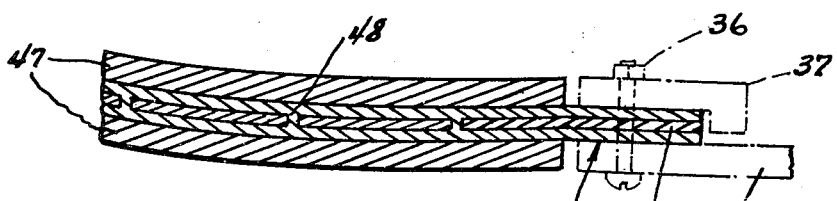
Figure 8:
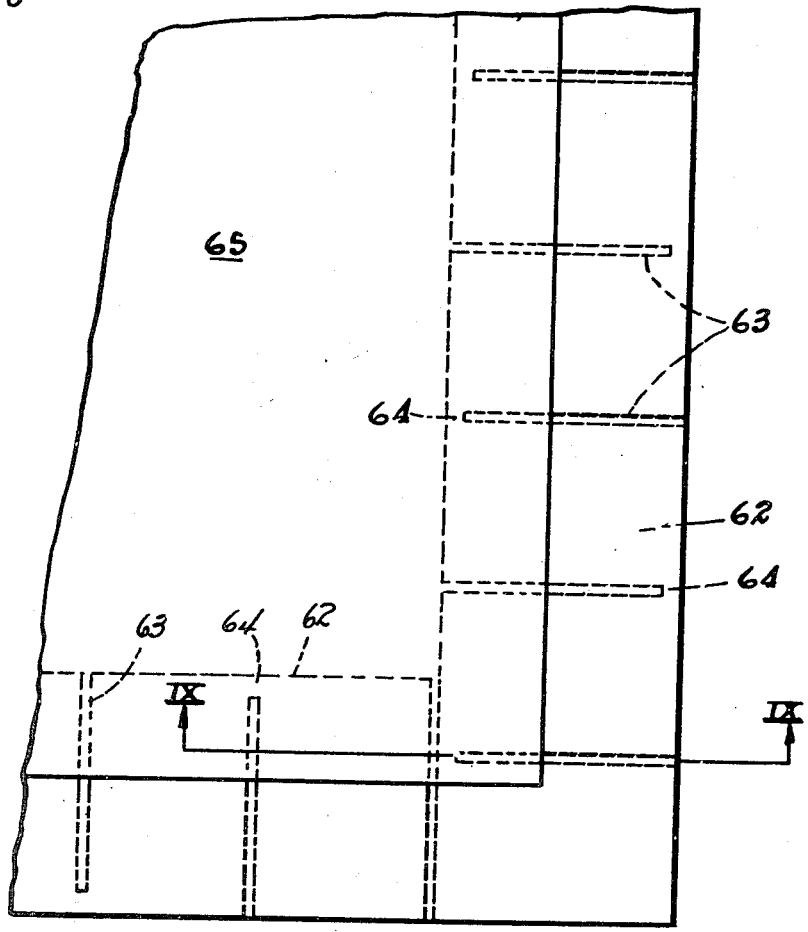
Figure 9:
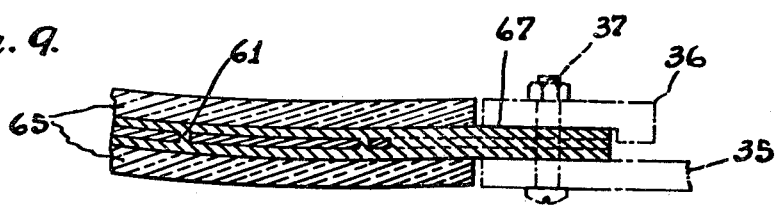

In the drawing:

Fig. 1 is a fragmentary diagrammatic perspective of a window unit; Fig. 2 is a fragmentary perspective of strip metal for incorporation in marginal portions of a laminated article; Fig. 3 is a fragmentary perspective similar to Fig. 2 of another form of strip metal; Fig. 4 is a fragmentary plan of a laminated unit constructed according to the invention; Fig. 5 is a fragmentary cross-section taken substantially along the line V—V of Fig. 4; Fig. 6 is a fragmentary plan of a laminated unit including another form of marginal structure; Fig. 7 is a fragmentary cross-section taken substantially along the line VII—VII of Fig. 6; Fig. 8 is a fragmentary plan of a laminated unit in which the invention has been incorporated in another form; Fig. 9 is a fragmentary cross-section taken substantially along the line IX—IX of Fig. 8; and Fig. 10 is a fragmentary vertical section of elements of a laminated article shown in disassembled relation.

In one form of the invention a window unit 20 is composed primarily of laminated transparent plastic or laminated glass. Referring to Figs. 1 to 5, layers of thermoplastic resinous material 23, such as Lucite, which is a form of methyl methacrylate resin is laminated upon opposite sides of an interlayer 24 of softer vinyl acetal resin or other laminating plastic which is bonded under the influence of heat and pressure to the outer layers 23. Detailed description of laminated articles of this type is found in the copending application of Irving E. Muskat, Serial No. 433,361, filed March 4, 1942, for Safety glass.

In preparing the plastic sheets they are assembled upon a support 25. The sheet interlayer 24 in this instance is composed of three laminations 26, 27, and 28 (Fig. 10), the first of which is laid upon the lower sheet 23. Then a sheet 27 of smaller area is laid upon the sheet 26. Strip metal 29, is laid upon the sheet 26 in abutting relation around the perimeter of the sheet 27 in the same general plane thereof. Since the metal, which can be in the form of aluminum, or alloy thereof, is very thin, the intermediate sheet 27 can be omitted if desired. The succeeding sheets 28 and 23 are then applied so that the strip metal is covered by the plastic in the marginal area of the assembled sheets. The plastic sheets with the strip metal included is then bonded in the manner disclosed in said copending application.

Since metal, such as aluminum and the plastic or resins differ materially as to coefficients of thermal expansion, it has been difficult to devise a satisfactory laminated plastic unit in which the stronger strip metal inserts along the marginal portions of the unit could be employed as a part of a practicable structure. It has been found that the strip metal inserts are rendered practicable in this connection by cutting or sawing them transversely through the width thereof, as indicated at 30, to form metal sections 31 connected by flexible neck portions 32. The sectional strip metal is then included in the laminated structure.

After the sheets of material have been assembled with the strip metal at the marginal portions, the edge of the strip metal indicated at 33, including the neck portions 32 are sheared or trimmed off to leave separate metal sections held in place by the plastic matrix in which they are supported. These sections of strip metal as a group can flex with the flexing of the plastic unit and the extended interlayer, with the strip metal therein, constitutes a flexible mounting flange 34. Each metal section can be bent or flexed to conform with irregularities that may occur in the mounting of the unit. Differences in coefficients of expansion of the plastic and metal are no longer significant because the sections are not sufficiently large to interfere with expansion and contraction of the plastic and can adapt themselves to distortion or changes incidental to the mounting and operation thereof.

A laminated unit of this type is particularly adapted for incorporation in airplane wall or frame structure 35 which is considerably flexible and subject to distortion. Clamping members 36 and 37 secure the mounting flange 34 in fluid-tight relation to the wall structure. Considerable tolerance is available because of the flexibility and deformability of the sectional strip metal and plastic of which the mounting flange is composed and these characteristics further adapt the flange more favorably to fluid-tight connection under varying conditions.

In an alternative form of structure it is proposed, as shown in Figs. 6 and 7, to cut strip metal 40 alternately from opposite edges, as indicated at 41, in order to leave neck portions 42 disposed alternately on opposite sides of the strip metal, and to define sections 43. In this arrangement, because of the flexibility of the neck portions, the strip metal is capable of appreciable overall expansion or contraction and is, therefore, suitable for incorporation in the marginal portion of the laminated unit without trimming off the outer neck portions. However, if desired, in this arrangement, as well as that shown in Figs. 4 and 5, the outer edges of the strip metal can be trimmed off to leave separate sections each of which is cut transversely almost through its width. If desired the entire laminated window can be made substantially the same thickness throughout and after the assembly and bonding of the elements the marginal portions of the outer plastic layers 47 can be cut or ground off to define a thinner mounting flange 46 which in effect constitutes an extended portion of the reinforced interlayer 48. It is to be understood that in any event the edges of the outer layers 47 of plastic overlap the inner marginal portions of the strip metal throughout the marginal portions of the unit. The plastic layers 47 and 48 correspond to the layers 23 and 24 described above. Likewise the flange 46 is engageable by the wall structure 35 and clamping members 36 and 37 in the same manner as the flange 34.

Referring to Figs. 7 and 8, the window unit 20 can be constructed in the form of an interlayer 61 of plastic corresponding in form and construction to the interlayer 24 and including therein strip metal 62 cut transversely from opposite edges at intervals, as indicated at 63, almost through its width so as to leave alternate neck portions 64 at opposite edges thereof. In this construction glass plates 65 are bonded on opposite sides of the interlayer 61 in such relation that the marginal portions of the glass plates throughout their perimeters overlap the inner edges of the strip metal. The metal and plastic extending beyond the edges of the glass constitute a flexible mounting flange 67. This flange is connectable to the supporting superstructure or frame 35 and clamping members 36 and 37 in the same manner as that described with reference to Figs. 4 and 5. Conditions may arise under which increased flexibility is desired in the mounting flange of the laminated glass, in which case, the outer edges of the flange including the outer neck portions can be trimmed off to leave separate metal sections.

From this description it will be apparent that the strip metal can be employed in flexible mounting flanges in both laminated glass and laminated plastic articles and that the neck portions in the alternately cut strip metal may or may not be trimmed off, depending upon the structure thereof as described above and the degree of flexibility or relative differences in coefficients of expansion that may exist under varying conditions.

Since thermoplastic material, such as Lucite, can be softened under the influence of heat and bent upon a mold of desired curvature according to well-known practices in the art, specific methods of bending the laminated plastic unit is not deemed to be necessary. Examples of such bending of thermoplastic material can be found in U. S. Patents 2,142,445 and 2,123,552. Marginal structure including sectional strip metal is applicable regardless of whether the laminated plastic or laminated glass is curved or flat, although the invention provides for a very efficient construction for the mounting flange in connection with the use of panels having curvatures, such as those employed in the manufacture of streamlined airplanes, and in which irregularities between the panel and supporting frames must be compensated for.

In case thermosetting plastic is employed instead of the Lucite, the monomer from which the thermosetting plastic is formed can be cast between suitable curved molding walls according to the practice described in the Muskat application above identified.

The use of curved glass in laminated units is common in the art. It is the application and combination of sectional strip metal in laminating such curved glass, as well as in laminating flat glass, that constitutes an additional phase of the invention herein described and claimed.

Although several forms of the invention have been shown and described in detail it will be apparent to those skilled in the art that the invention is not limited to such forms, but that various changes can be made therein within the scope of the appended claims.

I claim:

1. A method of making a laminated transparent panel, which comprises cutting a flexible metal strip transversely through a major portion of its width at a plurality of locations to define multiple strip sections joined together, applying the sectional metal strip along the marginal portion of interlayer sheet material of organic plastic, applying sheets of transparent material on opposite sides of the interlayer material and strip metal with the metal disposed along the marginal portion of the structure thus formed, and bonding the several sheets and strip metal under the influence of heat and pressure sufficient to form a composite laminated unit.

2. A method of making a laminated transparent panel, which comprises cutting flexible strip metal transversely through a major portion of its width at a plurality of locations to form multiple strip metal sections joined by integral neck portions, applying the sectional strip metal along the marginal portion of interlayer sheet material of organic plastic with the integral neck portions adjacent the outer edge of the strip metal, applying sheets of transparent material on opposite sides of the interlayer sheet material and strip metal with the metal disposed along the marginal portion of the structure thus formed, trimming off the integral connecting neck portions of the strip metal to form a plurality of separate metal sections, and joining the several sheets of plastic and the strip metal under the influence of heat and pressure sufficient to form a composite laminated unit.

3. In a method of making a transparent panel, the steps which comprise cutting flexible strip metal transversely through major portions of its width at a plurality of locations to form multiple strip metal sections joined by integral edge portions, applying the sectional strip metal between marginal portions of interlayer sheets of organic plastic to cover the strip metal, applying sheets of transparent material on opposite sides of the interlayer sheets in overlapping relation to the strip metal, trimming off the integral edge portions of the strip metal to form a plurality of separate metal sections, and bonding the sheets and strip metal under the influence of heat and pressure sufficient to form a composite laminated unit.

4. In a method of making a transparent panel, the steps which comprise cutting flexible strip metal transversely through major portions of its width at a plurality of locations to form multiple strip metal sections joined by integral edge portions, applying sectional strip metal between marginal portions of interlayer sheets of thermoplastic organic resinous material to cover the strip metal, applying glass plates on opposite sides of the interlayer sheets in overlapping relation to the strip metal, trimming off said integral edge portions of the strip metal to form a plurality of separate metal sections substantially embedded in the thermoplastic resinous material, and bonding together the sheets, plates and strip metal under the influence of heat and pressure sufficient to form a composite laminated unit.

5. A method of making a laminated transparent panel, which comprises cutting flexible strip metal transversely through major portions of its width at a plurality of locations to form multiple strip metal sections joined by integral neck portions, confining the strip metal between marginal portions of sheets of organic plastic interlayer material to cover the strip metal throughout the perimeter of the interlayer material with the integral neck sections at the outer edge of the strip metal, applying sheets of transparent plastic harder than that of the interlayer sheets on opposite sides of the latter and in overlapping relation to the strip metal throughout the perimeter of said metal, trimming off the integral neck portions of the strip metal to form a plurality of separate metal sections along the marginal portions of the assembled elements, and bonding the several sheets and strip metal under the influence of heat and pressure sufficient to form a composite laminated unit.

6. A laminated window panel comprising strip metal having a plurality of transverse cuts substantially dividing the metal into multiple sections and including neck portions integrally joining adjacent sections, sheet interlayer material of organic plastic covering and supporting the strip metal in bonded relation thereto along the marginal portions of said interlayer material, sheets of transparent material bonded upon opposite sides of the interlayer material and overlapping the inner marginal portions of the strip metal.

7. A laminated window panel comprising strip metal having a plurality of transverse cuts substantially dividing the metal into multiple sections and including neck portions integrally joining adjacent sections, sheet interlayer material of organic plastic covering and supporting the strip metal in bonded relation thereto along the marginal portions of said interlayer material, sheets of transparent material bonded upon opposite sides of the interlayer material and overlapping the inner marginal portions of the strip metal, the latter together with its covering interlayer material extending outwardly beyond the edges of said transparent sheets.

8. A laminated window panel comprising strip metal having a plurality of transverse cuts substantially dividing the metal into sections, sheet interlayer material of organic plastic covering and supporting the strip metal in bonded relation thereto along the marginal portions of said interlayer material, said sheet material being disposed between and substantially surrounding the metal sections to form an integral plastic matrix for said sections, plastic sheets of transparent material harder than the sheet interlayer material bonded upon opposite sides of the latter and overlapping the inner marginal portions of the strip metal.

9. A laminated window panel comprising strip metal having a plurality of transverse cuts substantially dividing the metal into multiple sections and including neck portions integrally joining adjacent sections, sheet interlayer material of organic plastic covering and supporting the strip metal in bonded relation thereto along the marginal portions of said interlayer material, glass sheets bonded upon opposite sides of the sheet interlayer and overlapping the inner marginal portions of the strip metal, the latter metal together with its covering interlayer material extending outwardly beyond the edges of said glass sheets.

10. A laminated window panel comprising flexible strip metal having a plurality of transverse cuts substantially dividing the metal into multiple sections including neck portions integrally joining adjacent sections along one edge of the strip metal, sheet interlayer material of organic plastic covering and supporting the strip metal in bonded relation thereto along the marginal portions of said interlayer material with integral neck portions disposed inwardly, glass sheets bonded upon opposite sides of the sheet interlayer material in overlapping relation to the inner marginal portions of the strip metal and with said integral neck portions disposed between the marginal portions of the glass sheets, the outer section portions of the strip metal extending freely beyond the edges of the glass sheets to form mounting flanges to which clamping elements are adapted to be applied.

11. In a method of making a transparent laminated window unit having a series of sections of strip metal incorporated in its marginal portions, the steps which comprise assembling transparent panels in superposed relation and coextensively on opposite sides of sheet interlayer material of organic plastic, incorporating with said interlayer material between the marginal portions of the panels strip metal divided transversely into a series of sections independently flexible, and bonding the assembled elements of panels, interlayer material, and strip metal under the influence of heat and pressure sufficient to form a composite laminated unit.

THOMAS K. GREGORIUS.

REFERENCES CITED

The following references are of record in the file of this patent:

UNITED STATES PATENTS

| Number | Name | Date |
| --- | --- | --- |
| 2,322,582 | Marini | June 22, 1943 |
| 2,302,740 | Boicey | Nov. 24, 1942 |
| 2,300,506 | Kamerer | Nov. 3, 1942 |